(12) United States Patent
Chu

(10) Patent No.: US 12,394,949 B2
(45) Date of Patent: Aug. 19, 2025

(54) RETRACTABLE CABLE BOX AND ELECTRONIC DEVICE SUITABLE FOR STORING LONGER DATA CABLE

(71) Applicant: LANTO ELECTRONIC LIMITED, Kunshan (CN)

(72) Inventor: Changsing Chu, Kunshan (CN)

(73) Assignee: LANTO ELECTRONIC LIMITED, Kunshan (CN)

(*) Notice: Subject to any disclaimer, the term of this patent is extended or adjusted under 35 U.S.C. 154(b) by 308 days.

(21) Appl. No.: 18/212,398

(22) Filed: Jun. 21, 2023

(65) Prior Publication Data
US 2024/0243531 A1 Jul. 18, 2024

(30) Foreign Application Priority Data

Jan. 18, 2023 (CN) .......................... 202310066060.2

(51) Int. Cl.
*H01R 13/72* (2006.01)
*H02G 11/02* (2006.01)

(52) U.S. Cl.
CPC ............. *H01R 13/72* (2013.01); *H02G 11/02* (2013.01)

(58) Field of Classification Search
CPC ....... H01R 13/72; G06F 1/1632; H02G 11/02; H02J 7/0042; H02J 50/00; H02J 50/005
See application file for complete search history.

(56) References Cited

U.S. PATENT DOCUMENTS

| | | | |
|---|---|---|---|
| 6,325,665 B1 | 12/2001 | Chung | |
| 6,803,525 B1 * | 10/2004 | Liao | B65H 75/4423 439/35 |
| 7,389,955 B2 * | 6/2008 | Liao | B65H 75/4431 242/378.1 |
| 8,136,751 B2 * | 3/2012 | Chen | H02G 11/02 242/378.1 |
| 2012/0320546 A1 * | 12/2012 | Wu | H02G 11/02 361/755 |

FOREIGN PATENT DOCUMENTS

| | | |
|---|---|---|
| CN | 210724275 U | 6/2020 |
| CN | 216215939 U | 4/2022 |
| CN | 217535033 U | 10/2022 |
| CN | 218005457 U | 12/2022 |

* cited by examiner

Primary Examiner — Briggitte R. Hammond
(74) Attorney, Agent, or Firm — Birch, Stewart, Kolasch & Birch, LLP

(57) ABSTRACT

A retractable cable box includes a shell, a cable-receiving component, a connection plate and a guiding element. The shell has an inner cavity and a storage opening. The shell includes a first shell and a second shell. The first shell is rotatable relative to the second shell. The cable-receiving component is disposed in the inner cavity and fixedly connected to the first shell. The second shell has a mounting hole. The connection plate is passed through the mounting hole and fixedly connected to the cable-receiving component. The guiding element is mounted to the cable-receiving component. The second shell has a track groove. By rotating the cable-receiving component relative to the second shell, the guiding element moves along the track groove, so that a data cable is coiled or loosened from the cable-receiving component. An electronic device having the retractable cable box is disclosed.

20 Claims, 13 Drawing Sheets

RETRACTABLE CABLE BOX AND ELECTRONIC DEVICE SUITABLE FOR STORING LONGER DATA CABLE

CROSS-REFERENCE TO RELATED APPLICATION

This patent application claims priority of a Chinese Patent Application No. 202310066060.2, filed on Jan. 18, 2023 and titled "RETRACTABLE CABLE BOX AND ELECTRONIC DEVICE", the entire content of which is incorporated herein by reference.

TECHNICAL FIELD

The present disclosure relates to a technical field of terminal auxiliary equipment, in particular to a retractable cable box and an electronic device.

BACKGROUND

Electronic devices include charging pads, connector expansion bases, smart speakers and smart home appliances, etc. Conventional electronic devices do not have a storage function. When not in use, the data cable is exposed outside a main body of the electronic device, so it is relatively easy to be damaged. In related technologies, the electronic device includes a shell and a turntable arranged in the shell. The shell is provided with a fixed shaft. The turntable rotates around the fixed axis, so that the data cable can be wound on the turntable to realize storage.

If the data cable is directly wound, the length of the data cable needs to be limited to avoid excessive rotation due to the rotation angle range of the shell and a rotation shaft.

SUMMARY

An object of the present disclosure is to provide a retractable cable box and an electronic device, which are suitable for storing a longer data cable.

In order to achieve the above object, the present disclosure adopts the following technical solution: a retractable cable box, configured to accommodate a data cable, including: a shell having an inner cavity and a storage opening communicating with the inner cavity: the shell including a first shell and a second shell: the first shell being rotatable relative to the second shell: the second shell defining a mounting hole and a track groove: the track groove having an opening facing the inner cavity: a cable-receiving component disposed in the inner cavity and fixedly connected to the first shell: a connection plate passing through the mounting hole and fixedly connected to the cable-receiving component: and a guiding element mounted to the cable-receiving component: wherein by a rotation of the cable-receiving component relative to the second shell, the guiding element moves along the track groove so that the data cable is coiled or loosened from the cable-receiving component.

In order to achieve the above object, the present disclosure adopts the following technical solution: an electronic device, including: a data cable: a circuit board: at least two plug ports: and a retractable cable box, including: a shell having an inner cavity and a storage opening communicating with the inner cavity: the shell including a first shell and a second shell: the first shell being rotatable relative to the second shell: the second shell defining a mounting hole and a track groove: the track groove having an opening facing the inner cavity: a cable-receiving component disposed in the inner cavity and fixedly connected to the first shell: a connection plate passing through the mounting hole and fixedly connected to the cable-receiving component: and a guiding element mounted to the cable-receiving component: wherein the data cable is capable of being accommodated in the inner cavity: the plug ports and the data cable are electrically connected to the circuit board: and by a rotation of the cable-receiving component relative to the second shell, the guiding element moves along the track groove so that the data cable is coiled or loosened from the cable-receiving component.

In the retractable cable box of the present disclosure, the cable-receiving component rotates relative to the second shell, so that the guiding element moves along the track groove. As a result, it is possible to realize the rotation of the first shell around the second shell by more than 360 degrees, thereby realizing the storage of a longer data cable.

DETAILED DESCRIPTION

Figure 1:
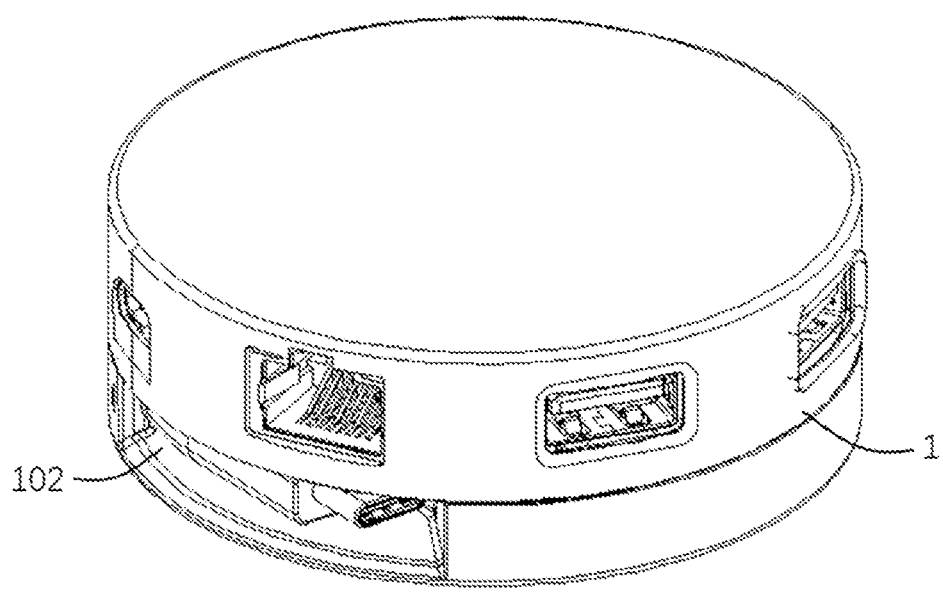
FIG. 1 is a structural view of an electronic device in accordance with a first embodiment of the present disclosure.

Exemplary embodiments will be described in detail here, examples of which are shown in drawings. When referring to the drawings below; unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one: "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 20, the present disclosure discloses an electronic device which includes a retractable cable box and a data cable 20. The retractable cable box is used for accommodating the data cable 20. When not in use, the data cable 20 can be retracted into the retractable cable box, which is convenient for organizing and storing the data cable 20.

Figure 2:
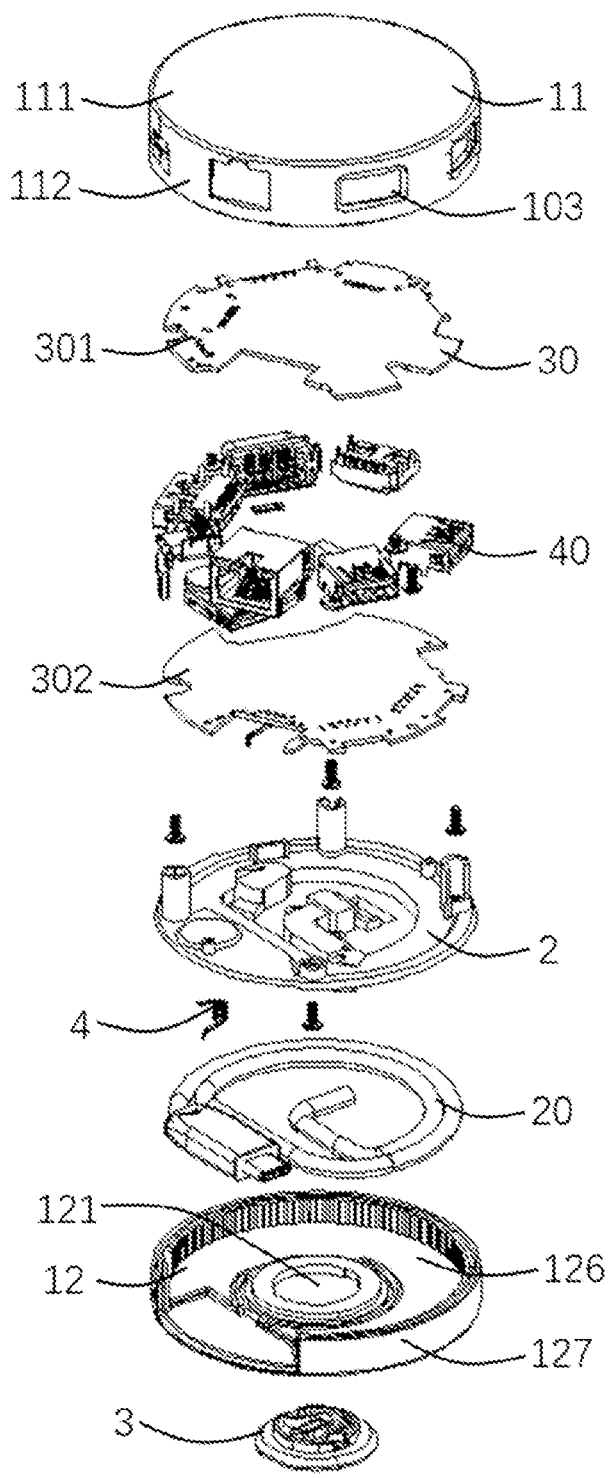
FIG. 2 is an exploded view of FIG. 1.
Figure 3:
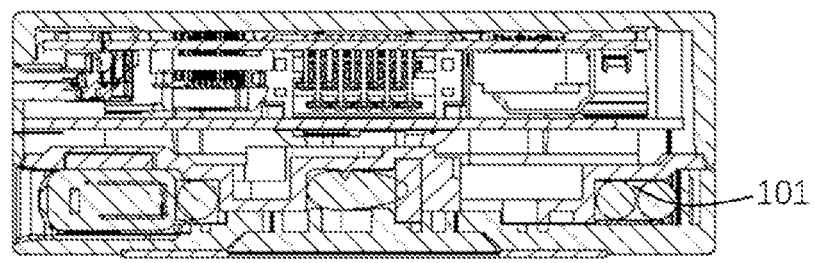
FIG. 3 is a sectional view of FIG. 1.
Figure 4:
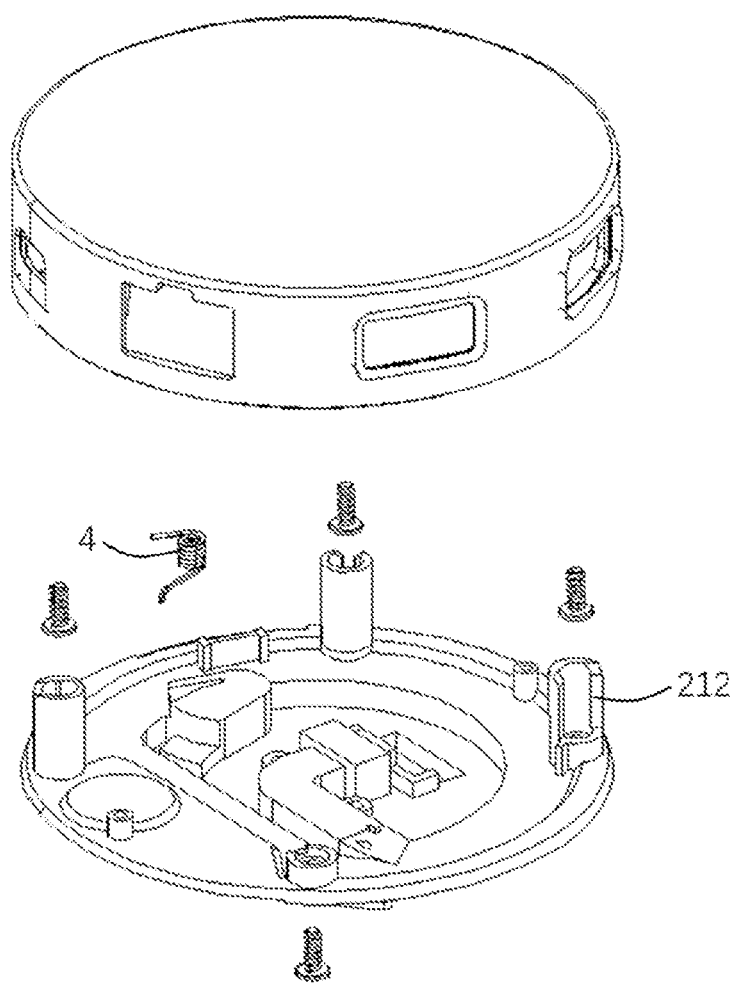
FIG. 4 is a structural view of a first shell and a cable-receiving component in FIG. 2.

Referring to FIG. 1 to FIG. 3, the retractable cable box includes a shell 1, a cable-receiving component 2 and a connection plate 3. The shell 1 is cylindrical in shape and beautiful in appearance. The shell 1 defines an inner cavity 101 and a storage opening 102 communicating with the inner cavity 101. The data cable 20 is retracted into the inner cavity 101 through the storage opening 102 and wound around the cable-receiving component 2. The data cable 20 can also be led out of the inner cavity 101 through the storage opening 102.

In an embodiment of the present disclosure, referring to FIG. 2, the shell 1 includes a first shell 11 and a second shell 12. The first shell 11 is rotatable relative to the second shell 12. The first shell 11 and the second shell 12 are located on a periphery of the inner cavity 101. Specifically, the first shell 11 includes a first wall portion 111 and a first peripheral wall 112 vertically extending from the first wall portion 111. The second shell 12 includes a second wall portion 126 and a second peripheral wall 127 vertically extending from the second wall portion 126. The storage opening 102 is provided on the second peripheral wall 127.

The cable-receiving component 2 is disposed in the inner cavity 101. The cable-receiving component 2 is fixedly connected to the first shell 1, and the cable-receiving component 2 can also be rotatable relative to the second shell 12. The inner cavity 101 between the cable-receiving component 2 and the second shell 12 is used as a storage cavity for storing the data cable 20.

Figure 5:
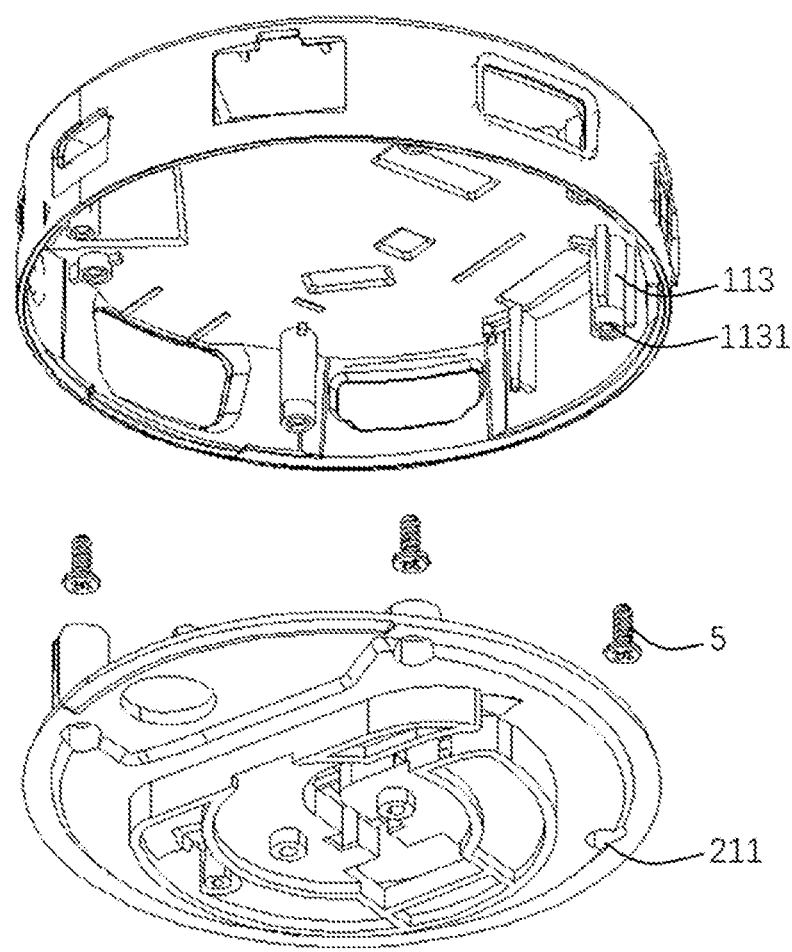
FIG. 5 is a structural view of FIG. 4 from another angle.
Figure 6:
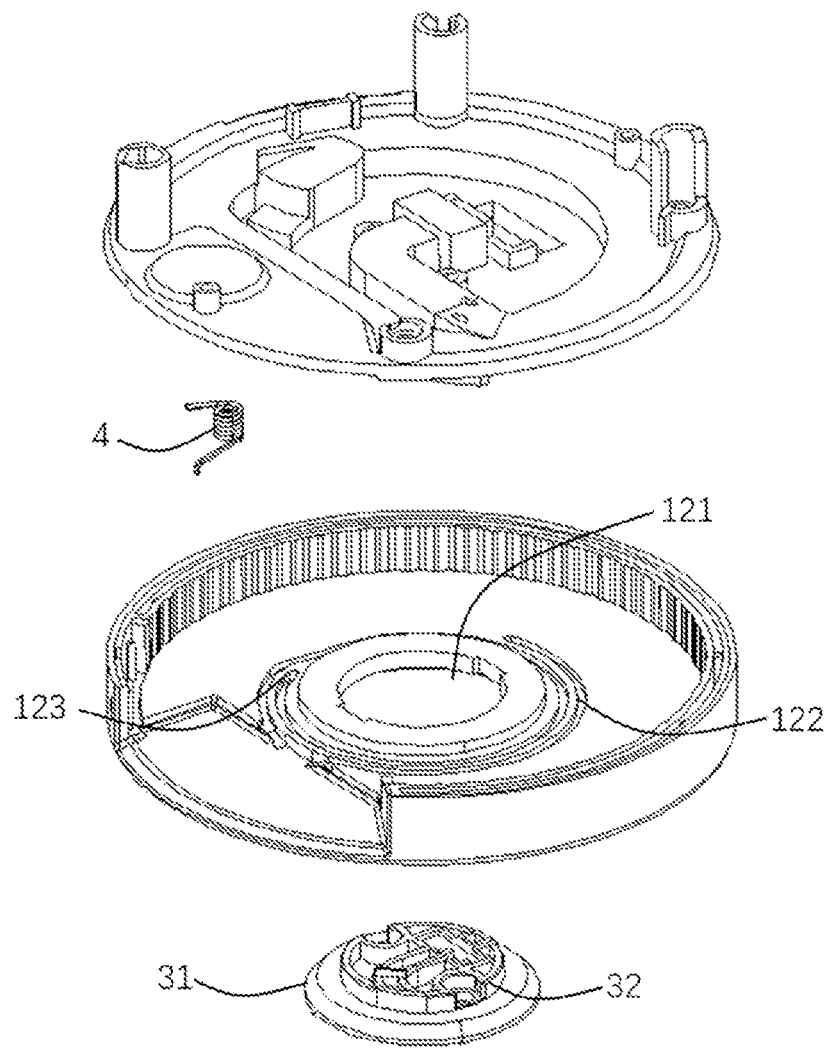
FIG. 6 is a structural view of the cable-receiving component and a second shell in FIG. 2.

Referring to FIG. 5, the cable-receiving component 2 is provided with a plurality of connecting holes 211. The first shell 11 further includes a plurality of support posts 113 vertically extending from the first wall portion 111. Each support post 113 has a threaded hole 1131 extending along a thickness direction of the cable-receiving component 2. The threaded hole 1131 is coaxial with a corresponding connecting hole 211. The retractable cable box further includes screws 5. The screws 5 are passed through the connecting holes 211 and screwed into corresponding threaded holes 1131, so that the cable-receiving component 2 can be stably connected to the first shell 11. In one embodiment of the present disclosure, referring to FIG. 4, the cable-receiving component 2 is further provided with a positioning sleeve 212. The positioning sleeve 212 is fixed on a surface of the cable-receiving component 2 facing the first shell 1. The support post 113 is mounted into the positioning sleeve 212, so as to improve the assembly efficiency of the retractable cable box.

The connection plate 3 is fixedly connected with the cable-receiving component 2. The connection plate 3 is rotatably connected with the second shell 12. Specifically, referring to FIG. 2 and FIG. 6, the second shell 12 defines a mounting hole 121. The connection plate 3 is movably passed through the mounting hole 121. The connection plate 3 includes a plate body 31 and a connecting portion 32 disposed on the plate body 31. The connecting portion 32 is passed through the mounting hole 121 and is fixedly connected with the cable-receiving component 2, such as by screws. An outer diameter of the plate body 31 is larger than an inner diameter of the mounting hole 121, so that the plate body 31 is restricted outside the mounting hole 121.

Referring to FIG. 2, the retractable cable box further includes a guiding element 4. The guiding element 4 is mounted to the cable-receiving component 2. The second shell 12 has a track groove 122. The track groove 122 is formed by inwardly recessing from the second wall portion 126. The track groove 122 has an opening facing the inner cavity 101. By rotating the cable-receiving component 2 relative to the second shell 12, the guiding element 4 is moved along the track groove 122, so that the data cable 20 is coiled or loosened from the cable-receiving component 2.

The guiding element 4 includes a guide portion 41, 41'. The second shell 12 further defines a limiting groove 123. The limiting groove 123 is located at an end of the track groove 122. The guide portion 41, 41' moves along the track groove 122, so that the data cable 20 is coiled or is loosened from the cable-receiving component 2, and the guide portion 41, 41' cooperates with the limiting groove 123 to restrict the rotation of the cable-receiving component 2 relative to the second shell 12.

Figure 8:
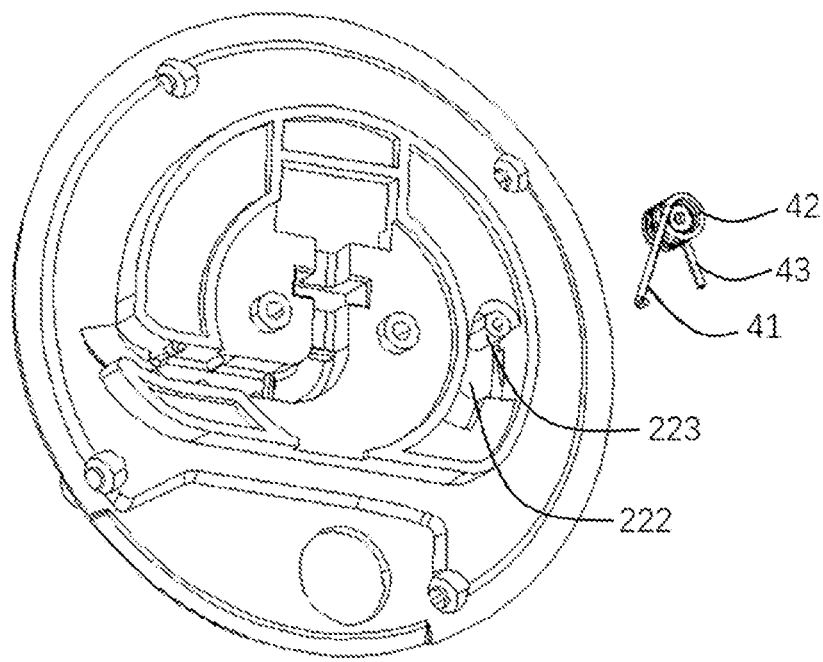
FIG. 8 is an exploded view of the cable-receiving component and the guiding element in FIG. 7.
Figure 9:
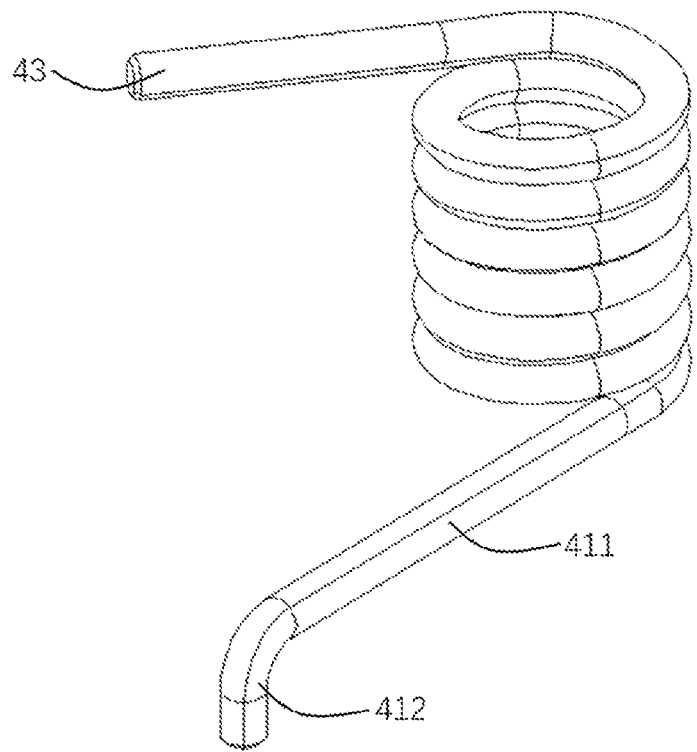
FIG. 9 is a structural view of the guiding element in FIG. 8.
Figure 10:
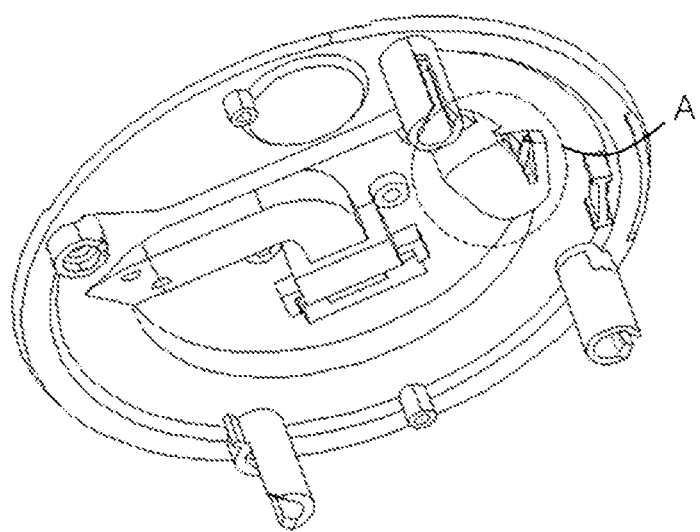
FIG. 10 is an assembly view of the cable-receiving component and the guiding element in FIG. 7.

In the first embodiment of the present disclosure, the guiding element 4 adopts a torsion spring. Referring to FIG. 8, the guiding element 4 includes the guide portion 41, an elastic body 42 and an end portion 43. The end portion 43 is connected to one end of the elastic body 42, and the guide portion 41 is connected to another end of the elastic body 42. The guide portion 41 is a bent structure. Referring to FIG. 9, the guide portion 41 includes a connecting arm 411 and a head portion 412 bent perpendicularly from an end of the connecting arm 411. At least part of the head portion 412 is movable along the track groove 122. The head portion 412 can also go deep into the limiting groove 123 to form a limiting connection. The end portion 43 is of a straight structure. The end portion 43 resists against the cable-receiving component 2. By using the torsion spring as the guiding element 4, since the torsion spring has elasticity, the first shell 1 can be rotated around the second shell 12 by more than 360 degrees, which is convenient for accommodating a longer data cable 20 and has a wide range of applications.

Figure 12:
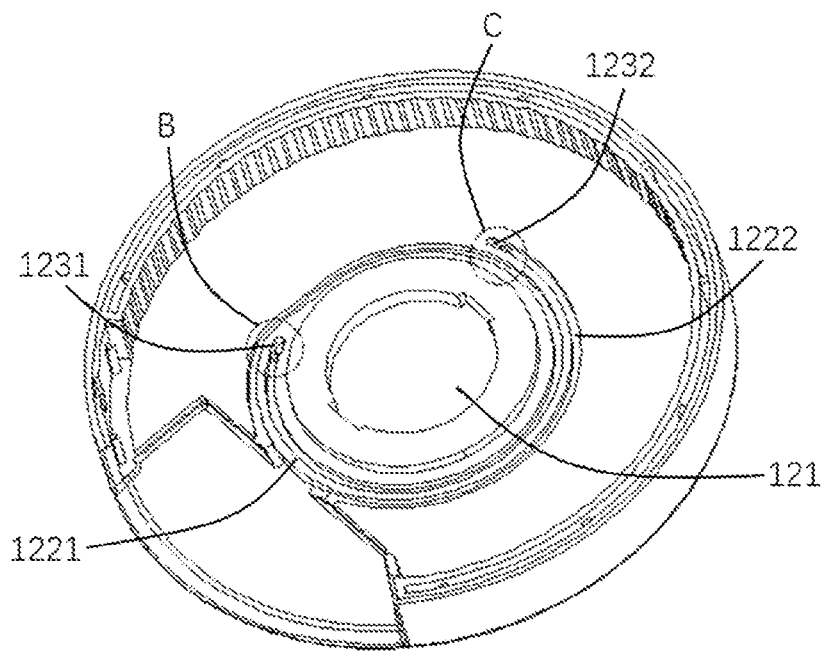
FIG. 12 is a structural view of the second shell in FIG. 2.

Referring to FIG. 12, the track groove 122 includes an inner track groove 1221 and an outer track groove 1222 communicating with the inner track groove 1221. The inner track groove 1221 is disposed around the mounting hole 121. The outer track groove 1222 is disposed around the inner track groove 1221. At least the inner track groove 1221 is an annular groove. The outer track groove 1222 can be an annular groove, or less than one circle. By setting the outer track groove 1222, the rotation angle of the cable-receiving component 2 around the second shell 12 can be greater than 365°, which has a good storage effect for the longer data cable 20.

Referring to FIG. 12, the limiting groove 123 includes a first limiting groove 1231 and a second limiting groove 1232. The first limiting groove 1231 is located at an end of the inner track groove 1221. The second limiting groove 1232 is located at an end of the outer track groove 1222. When the guide portion 41 is mated with the first limiting groove 1231, the data cable 20 is coiled around the cable-receiving component 2. When the guide portion 41 is mated with the second limiting groove 1232, the data cable 20 is loosened from the cable-receiving component 2. Through the cooperation of the guide portion 41 and the limiting groove, a locking effect is played. As a result, the relative rotation between the cable-receiving component 2 and the second shell 12 is restricted, so that the storage and use of the data cable 20 are more stable.

Figure 15:
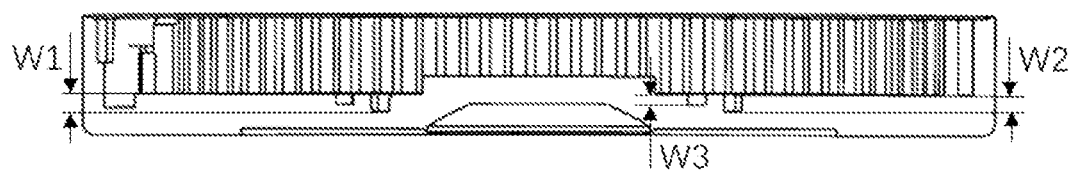
FIG. 15 is a sectional view of FIG. 12.

Referring to FIG. 15, the first limiting groove 1231 has a first depth W1 along a thickness direction of the second shell 12. The second limiting groove 1232 has a second depth W2 along the thickness direction of the second shell 12. The track groove 122 has a third depth W3 along the thickness direction of the second shell 12. Both the first depth W1 and the second 20) depth W2 are greater than the third depth W3. In this way, the head portion 412 of the guiding element 4 can be restricted in the limiting groove.

Figure 13:
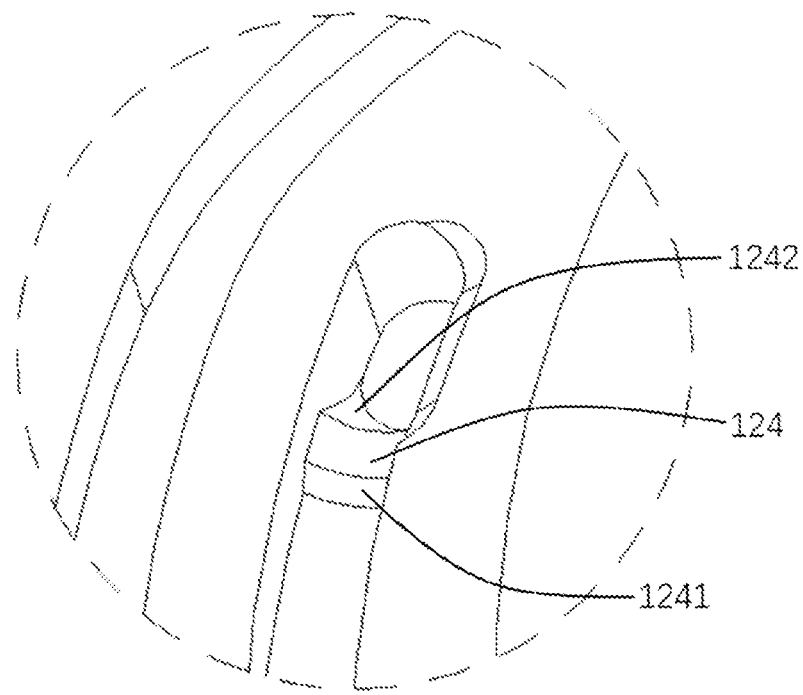
FIG. 13 is an enlarged structure view of area B in FIG. 12.
Figure 14:
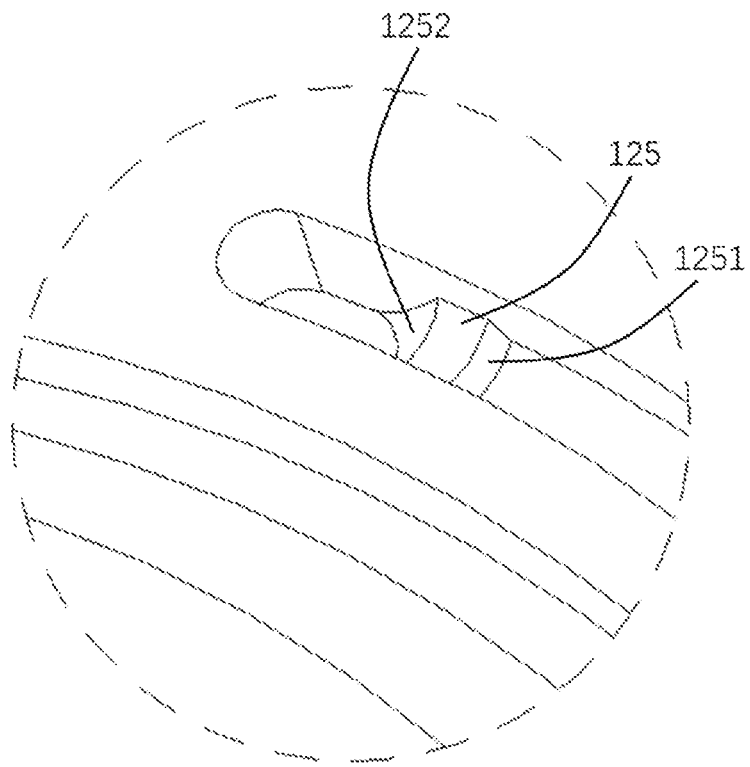
FIG. 14 is an enlarged structure view of area C in FIG. 12.

Referring to FIG. 13 and FIG. 14, a first blocking portion 124 is provided between the first limiting groove 1231 and the inner track groove 1221. A second blocking portion 125 is provided between the second limiting groove 1232 and the outer track groove 1222. By providing the first blocking portion 124 and the second blocking portion 125, the head portion 412 of the guiding element 4 is not easy to move from the limiting groove to the track groove 122. The first blocking portion 124 has a first inclined surface 1241 and a second inclined surface 1242. The first inclined surface 1241 faces the inner track groove 1221. The second inclined surface 1242 faces the first limiting groove 1231. The second blocking portion 125 has a third inclined surface 1251 and a fourth inclined surface 1252. The third inclined surface 1251 faces the outer track groove 1222. The fourth inclined surface 1252 faces the second limiting groove 1232. By setting two inclined surfaces on the blocking portion, it is beneficial for the head portion 412 of the guiding element 4 to slide from the track groove 1222 into the limiting groove under the action of external force, and it is also convenient for the head portion 412 of the guiding element 4 to slide from the limiting groove to the track groove 1222.

Figure 7:
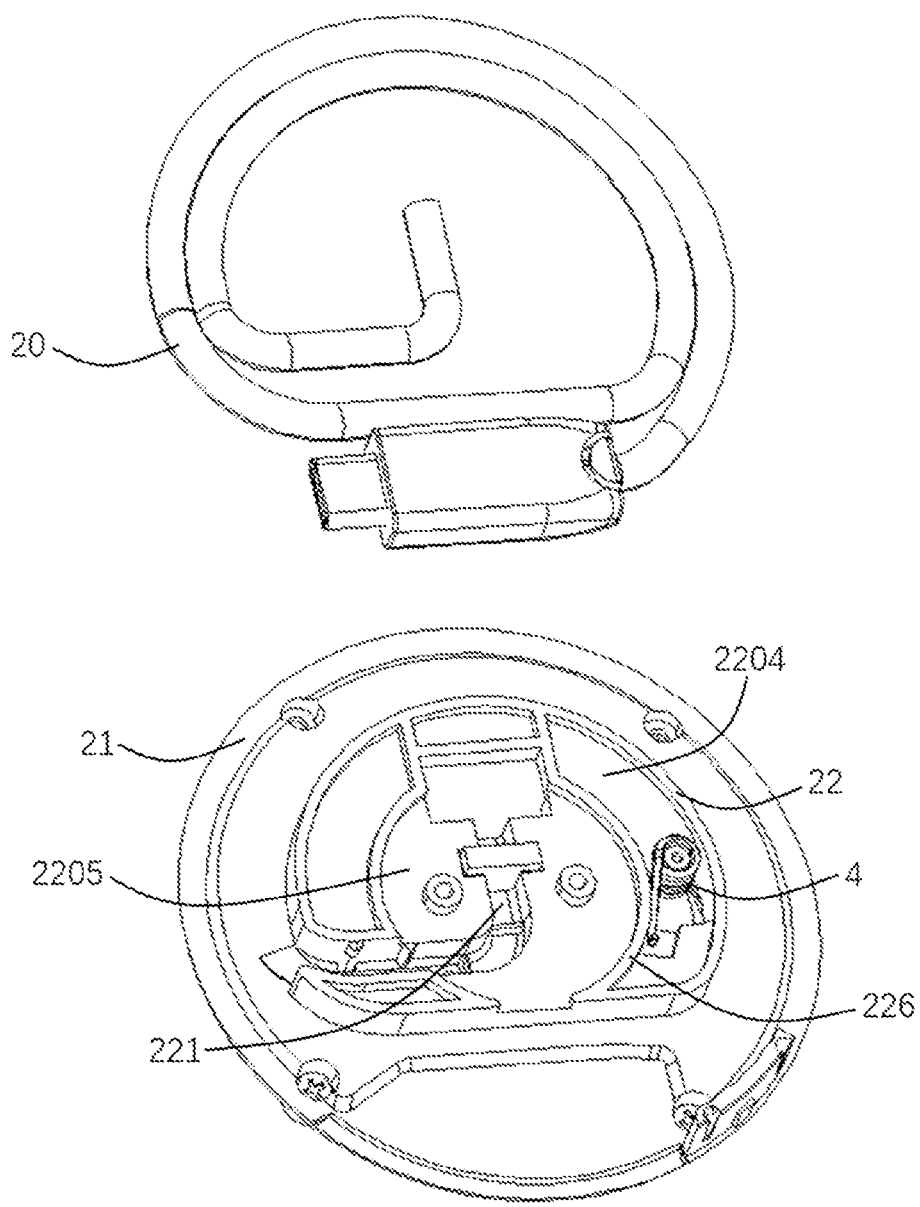
FIG. 7 is a structural view of the cable-receiving component, a guiding element and a data cable in FIG. 2.
Figure 11:
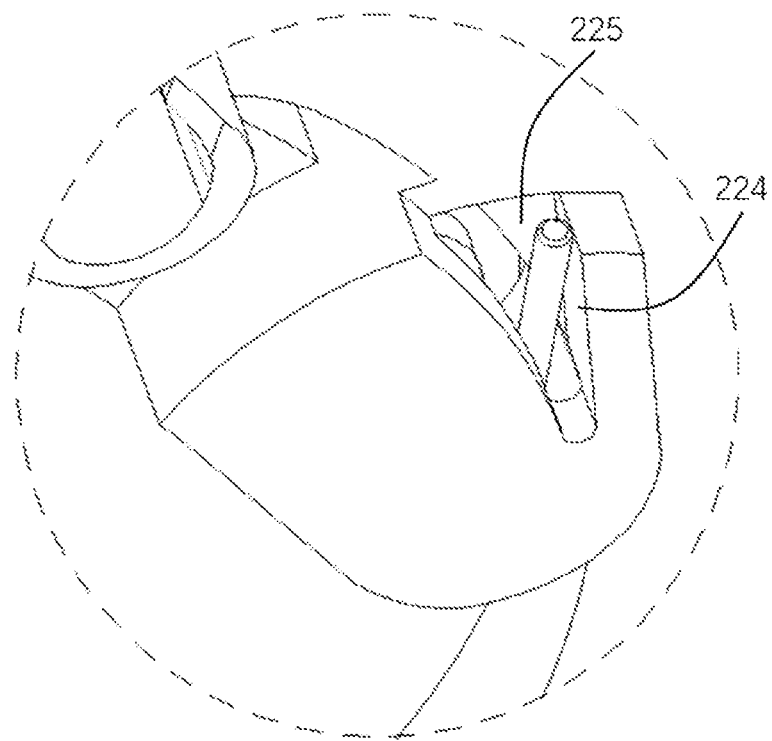
FIG. 11 is an enlarged structure view of area A in FIG. 10.

Referring to FIG. 7, the cable-receiving component 2 includes a bearing portion 21 and a cable winding portion 22. The cable winding portion 22 is disposed on a surface of the bearing portion 21 facing the second shell 12. The cable winding portion 22 defines a cable groove 221. One end of the data cable 20 is fixed in the cable groove 221. Part of the data cable 20 is stored in the cable groove 221, and another part of the data cable 20 is wound around the cable winding portion 22. In addition, referring to FIG. 8, the cable winding portion 22 is provided with a mounting groove 222. A columnar post 223 is fixed in the mounting groove 222. The elastic body 42 of the guiding element 4 is sleeved on the columnar post 223. Referring to FIG. 11, the cable winding portion 22 has a resisting portion 224. The end portion 43 of the guiding element 4 resists against the resisting portion 224.

In this embodiment, continue to refer to FIG. 11, the cable winding portion 22 defines a through hole 225 communicating with the mounting groove 222. An inner wall on one side of the through hole 225 is the resisting portion 224.

In this embodiment, referring to FIG. 7, the cable winding portion 22 includes a first groove body 2204 and a second groove body 2205. A spacer 226 is provided between the first groove body 2204 and the second groove body 2205. The spacer 226 can improve the structural strength of the cable-receiving component 2. By setting the groove bodies, it is beneficial to reduce weight. The mounting groove 222 communicates with the first groove body 2204. At least part of the guide portion 41 extends out of the first groove body 2204 for mating with the track groove 122 and the limiting groove 123. The connecting arm 411 of the guide portion 41 resists against the spacer 226.

Referring to FIG. 2, the electronic device further includes a circuit board 30 and at least two plug ports 40. The plug ports 40 are electrically connected to the circuit board 30. The circuit board 30 is fixed in the inner cavity 101 between the first shell 11 and the cable-receiving component 2. In one embodiment of the present disclosure, the circuit board 30 includes a first circuit board 301 and a second circuit board 302. The electronic device of this embodiment is a connector expansion base to provide functions of data signal transmission and charging. The connector expansion base includes an audio port, a USB port, a memory card port, a network port, a digital video port, a VGA analog video port and a Type-C port. Wherein, the audio port, the USB port, the memory card port and the network port are electrically connected to the first circuit board 301: the digital video port, the VGA analog video port and the Type-C port are electrically connected to the second circuit board 302. The second shell 12 defines a plurality of ports 103. Each plug port and multiple external devices are connected to the plug ports through the ports 103.

In this embodiment, the first circuit board 301 is disposed adjacent to the first shell 11, and the second circuit board 302 is disposed adjacent to the cable-receiving component 2. Both the first circuit board 301 and the second circuit board 302 are fixedly connected to the first shell 11 by screws.

In other embodiments, the electronic device can also be a charging board, and the first circuit board 301 of the electronic device is further provided with a wireless charging module to provide wireless charging for external devices.

Figure 16:
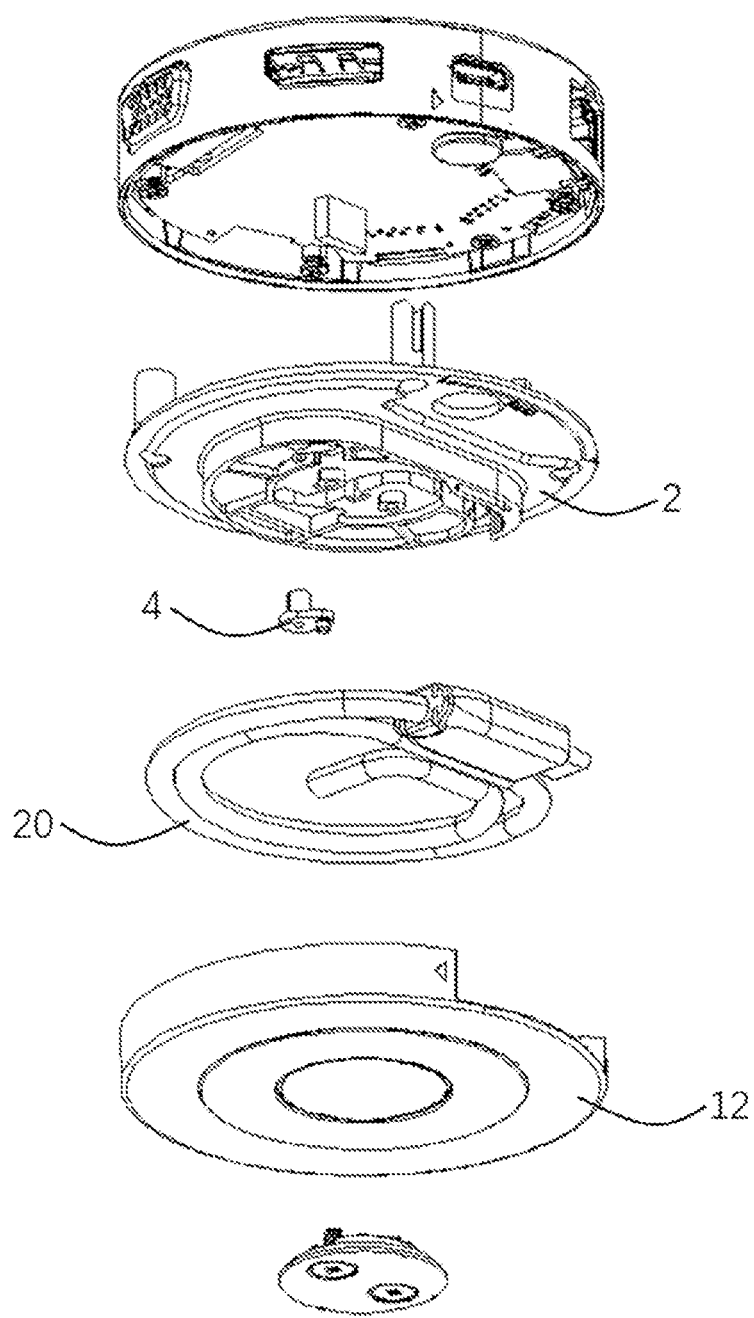
FIG. 16 is a structural view of an electronic device in accordance with a second embodiment of the present disclosure.
Figure 17:
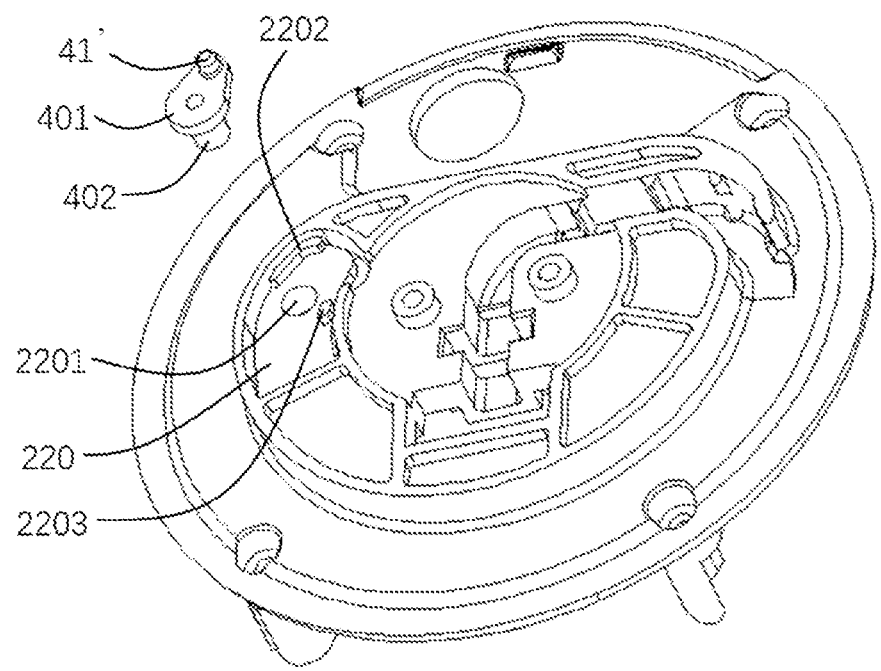
FIG. 17 is an exploded structural view of a cable-receiving component and a guiding element in FIG. 16.

In a second embodiment of the present disclosure, referring to FIG. 16 and FIG. 17, the guiding element 4 includes a guide potion 41', a main body 401 and a shaft portion 402. The shaft portion 402 is connected to one end of the main body 401, and the guide portion 41' is connected to another end of the main body 401. The cable winding portion 22 is provided with a shaft hole 2201 in which the shaft portion 402 is disposed, and the shaft portion 402 is rotatable in the shaft hole 2201.

Figure 18:
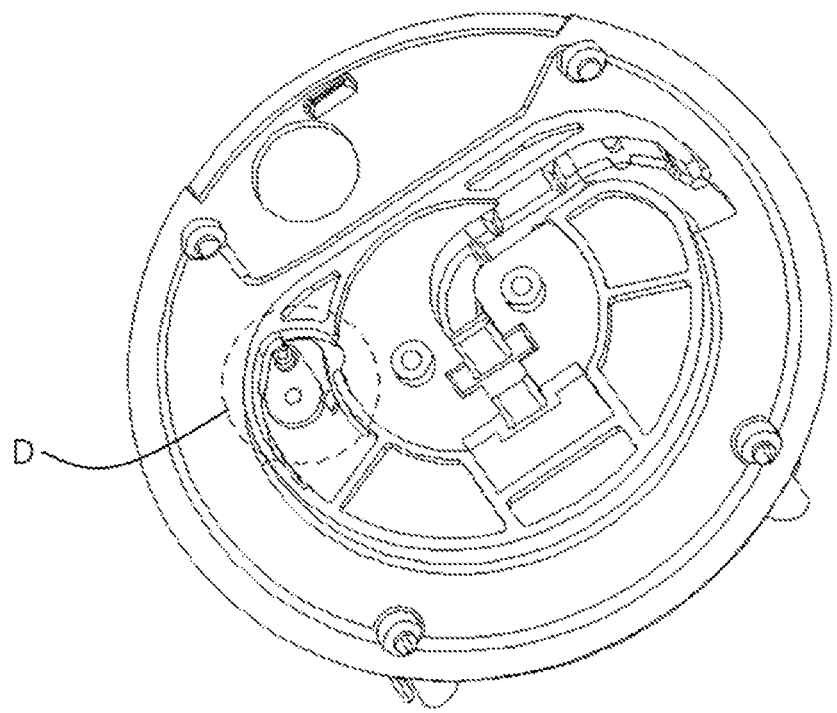
FIG. 18 is an assembly structure view of the cable-receiving component and the guiding element in FIG. 17.
Figure 19:
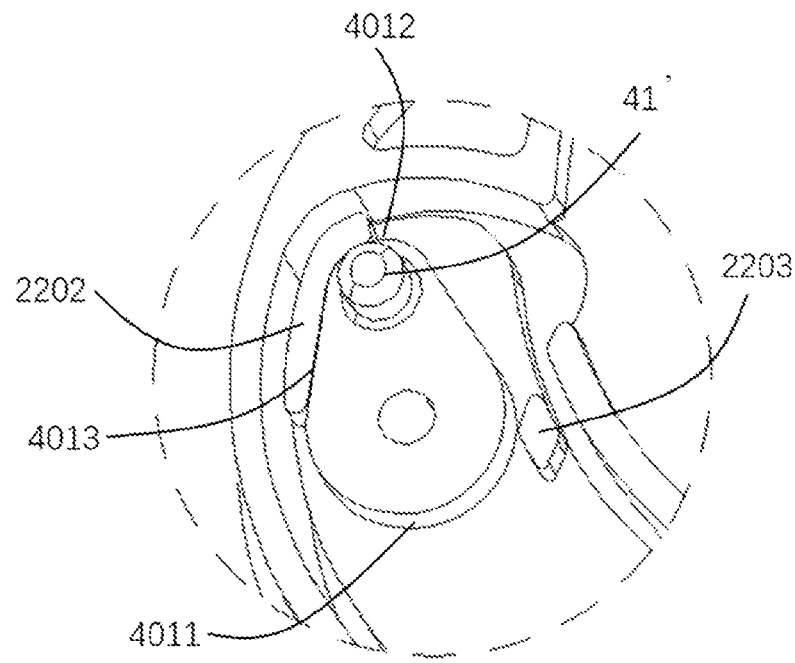
FIG. 19 is an enlarged structure view of area D in FIG. 18.

In this embodiment, referring to FIG. 17 to FIG. 19, the cable winding portion 22 is provided with a first limiting portion 2202 and a second limiting portion 2203. The guide portion 41' is movable between the first limiting portion 2202 and the second limiting portion 2203. In this way, the first shell 1 can rotate more than 360 degrees around the second shell 12, which is convenient for accommodating a longer data cable 20 and has a wide range of applications. The shaft hole 2201 is disposed on a bottom wall of the first groove body 2204 of the cable winding portion 22. The shaft hole 2201 communicates with the first groove body 2204. At least part of the guide portion 41' protrudes out of the first groove body 2204 for mating with the track groove 122 and the limiting groove 123. The guide portion 41' is in a shape of a cylinder, and its end is chamfered, which facilitates the guide portion 41' to slide into the limiting groove 123.

Figure 20:
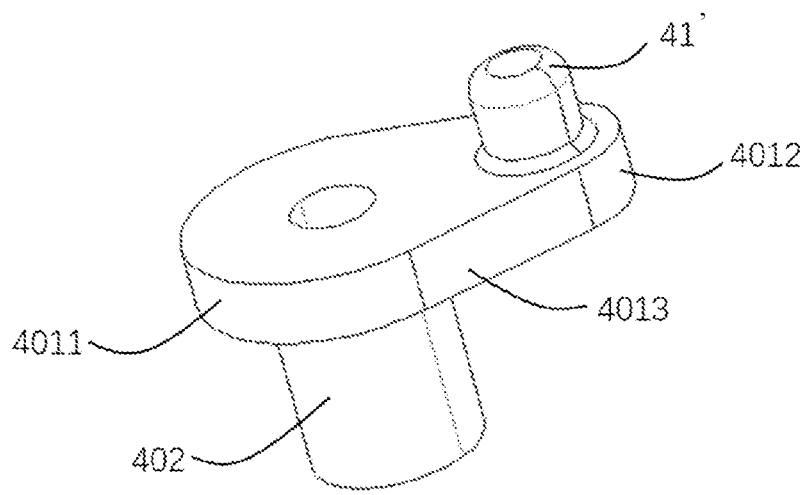
FIG. 20 is a structural view of the guiding element in FIG. 18.

Specifically, the main body 401 is of a flat plate structure. The guide portion 41' and the shaft portion 402 are provided on different surfaces of the main body 401 along the thickness direction. Referring to FIG. 19 and FIG. 20, the main body 401 includes a first arc-shaped surface 4011, a second arc-shaped surface 4012, and two flat surfaces 4013 connecting the first arc-shaped surface 4011 and the second arc-shaped surface 4012. A diameter of the first arc-shaped surface 4011 is larger than a diameter of the second arc-shaped surface 4012. The shaft portion 402 is located closer to the first arc-shaped surface 4011 relative to the second arc-shaped surface 4012. The guide portion 41' is located closer to the second arc-shaped surface 4012 relative to the first arc-shaped surface 4011.

An inner surface of the first limiting portion 2202 fits with part of the second arc-shaped surface 4012 and one of the flat surfaces 4013, and an inner surface of the second limiting portion 2203 fits with at least part of the other flat surface 4013, so as to realize the movable restriction of the guiding element 4.

When the guide portion 41' mates with the first limiting groove 1231, the data cable 20 is coiled around the cable-receiving component 2. When the guide portion 41' mates with the second limiting groove 1232, the data cable 20 is loosened from the cable-receiving component 2. The mutual cooperation between the guide portion 41' and the limiting groove plays a locking role, thereby restricting the relative rotation of the cable-receiving component 2 and the second shell 12, making the storage and use of the data cable 20 more stable.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A retractable cable box, configured to accommodate a data cable, comprising:
    a shell having an inner cavity and a storage opening communicating with the inner cavity; the shell comprising a first shell and a second shell: the first shell being rotatable relative to the second shell: the second shell defining a mounting hole and a track groove: the track groove having an opening facing the inner cavity;
    a cable-receiving component disposed in the inner cavity and fixedly connected to the first shell;
    a connection plate passing through the mounting hole and fixedly connected to the cable-receiving component; and
    a guiding element mounted to the cable-receiving component;
    wherein by a rotation of the cable-receiving component relative to the second shell, the guiding element moves along the track groove so that the data cable is coiled or loosened from the cable-receiving component.

2. The retractable cable box according to claim 1, wherein the guiding element comprises a guide portion: the second shell further defines a limiting groove located at an end of the track groove: the guide portion moves along the track groove so that the data cable is coiled or loosened from the cable-receiving component: the guide portion cooperates with the limiting groove to limit the rotation of the cable-receiving component relative to the second shell.

3. The retractable cable box according to claim 2, wherein the cable-receiving component comprises a bearing portion and a cable winding portion: the cable winding portion is disposed on a surface of the bearing portion facing the second shell: the cable winding portion defines a cable groove: one end of the data cable is fixed in the cable groove: part of the data cable is stored in the cable groove, and another part of the data cable is wound around the cable winding portion.

4. The retractable cable box according to claim 3, wherein the guiding element comprises a guide portion, an elastic body and an end portion: the end portion is connected to one end of the elastic body: the guide portion is connected to another end of the elastic body: the cable winding portion defines a mounting groove in which a columnar post is fixed: the elastic body is sleeved on the columnar post: the cable winding portion has a resisting portion; and the end portion resists the resisting portion.

5. The retractable cable box according to claim 3, wherein the guiding element comprises a guide portion, a main body and a shaft portion: the shaft portion is connected to one end of the main body: the guide portion is connected to another end of the main body: the cable winding portion defines a shaft hole in which the shaft portion is disposed.

6. The retractable cable box according to claim 5, wherein the cable winding portion comprises a first limiting portion and a second limiting portion: the guide portion is movable between the first limiting portion and the second limiting portion.

7. The retractable cable box according to claim 2, wherein the track groove comprises an inner track groove and an outer track groove communicating with the inner track groove: the inner track groove is arranged around the mounting hole; and the outer track groove is arranged around the inner track groove.

8. The retractable cable box according to claim 7, wherein the limiting groove comprises a first limiting groove and a second limiting groove: the first limiting groove is located at an end of the inner track groove: the second limiting groove is located at an end of the outer track groove: when the guide portion cooperates with the first limiting groove, the data cable is coiled around the cable-receiving component: when the guide portion cooperates with the second limiting groove, the data cable is released from the cable-receiving component.

9. The retractable cable box according to claim 8, wherein the first limiting groove has a first depth along a thickness direction of the second shell: the second limiting groove has a second depth along the thickness direction of the second shell: the track groove has a third depth along the thickness direction of the second shell: both the first depth and the second depth are greater than the third depth.

10. The retractable cable box according to claim 9, wherein a first blocking portion is provided between the first limiting groove and the inner track groove; and a second blocking portion is provided between the second limiting groove and the outer track groove.

11. An electronic device, comprising:
a data cable;
a circuit board;
at least two plug ports; and
a retractable cable box, comprising:
   a shell having an inner cavity and a storage opening communicating with the inner cavity;
   the shell comprising a first shell and a second shell: the first shell being rotatable relative to the second shell: the second shell defining a mounting hole and a track groove: the track groove having an opening facing the inner cavity;
   a cable-receiving component disposed in the inner cavity and fixedly connected to the first shell;
   a connection plate passing through the mounting hole and fixedly connected to the cable-receiving component; and
   a guiding element mounted to the cable-receiving component;
wherein the data cable is capable of being accommodated in the inner cavity;
the plug ports and the data cable are electrically connected to the circuit board; and
by a rotation of the cable-receiving component relative to the second shell, the guiding element moves along the track groove so that the data cable is coiled or loosened from the cable-receiving component.

12. The electronic device according to claim 11, further comprising a wireless charging module arranged on the circuit board.

13. The electronic device according to claim 11, wherein the guiding element comprises a guide portion: the second shell further defines a limiting groove located at an end of the track groove: the guide portion moves along the track groove so that the data cable is coiled or loosened from the cable-receiving component: the guide portion cooperates with the limiting groove to limit the rotation of the cable-receiving component relative to the second shell.

14. The electronic device according to claim 13, wherein the cable-receiving component comprises a bearing portion and a cable winding portion: the cable winding portion is disposed on a surface of the bearing portion facing the second shell: the cable winding portion defines a cable groove: one end of the data cable is fixed in the cable groove: part of the data cable is stored in the cable groove, and another part of the data cable is wound around the cable winding portion.

15. The electronic device according to claim 14, wherein the guiding element comprises a guide portion, an elastic body and an end portion: the end portion is connected to one end of the elastic body: the guide portion is connected to another end of the elastic body: the cable winding portion defines a mounting groove in which a columnar post is fixed: the elastic body is sleeved on the columnar post: the cable winding portion has a resisting portion; and the end portion resists the resisting portion.

16. The electronic device according to claim 14, wherein the guiding element comprises a guide portion, a main body and a shaft portion: the shaft portion is connected to one end of the main body: the guide portion is connected to another end of the main body: the cable winding portion defines a shaft hole in which the shaft portion is disposed.

17. The electronic device according to claim 16, wherein the cable winding portion comprises a first limiting portion and a second limiting portion: the guide portion is movable between the first limiting portion and the second limiting portion.

18. The electronic device according to claim 13, wherein the track groove comprises an inner track groove and an outer track groove communicating with the inner track groove: the inner track groove is arranged around the mounting hole; and the outer track groove is arranged around the inner track groove.

19. The electronic device according to claim 18, wherein the limiting groove comprises a first limiting groove and a second limiting groove; the first limiting groove is located at an end of the inner track groove; the second limiting groove is located at an end of the outer track groove; when the guide portion cooperates with the first limiting groove, the data cable is coiled around the cable-receiving component; when the guide portion cooperates with the second limiting groove, the data cable is released from the cable-receiving component.

20. The electronic device according to claim 19, wherein the first limiting groove has a first depth along a thickness direction of the second shell; the second limiting groove has a second depth along the thickness direction of the second shell; the track groove has a third depth along the thickness direction of the second shell; both the first depth and the second depth are greater than the third depth; and
   wherein a first blocking portion is provided between the first limiting groove and the inner track groove; and a second blocking portion is provided between the second limiting groove and the outer track groove.

* * * * *